United States Patent
Kobori et al.

(10) Patent No.: US 8,066,385 B2
(45) Date of Patent: Nov. 29, 2011

(54) PROJECTION DISPLAY AND LIGHTING UNIT WITH DIFFUSION OPTICAL DEVICE

(75) Inventors: Tomoki Kobori, Kamakura (JP); Satoshi Ouchi, Kamakura (JP); Seiji Murata, Yokohama (JP); Hidehiro Ikeda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 663 days.

(21) Appl. No.: 12/018,532

(22) Filed: Jan. 23, 2008

(65) Prior Publication Data
US 2008/0204667 A1    Aug. 28, 2008

(30) Foreign Application Priority Data
Feb. 22, 2007    (JP) .................................. 2007-041672

(51) Int. Cl.
*G03B 21/28* (2006.01)
(52) U.S. Cl. ............. 353/51; 353/50; 348/743; 348/813
(58) Field of Classification Search ................ 353/84, 353/98, 121, 31, 32, 50, 51; 348/742–748, 348/813
See application file for complete search history.

(56) References Cited

U.S. PATENT DOCUMENTS

| | | | |
|---|---|---|---|
| 5,198,837 A * | 3/1993 | Ikshizaka et al. | 347/256 |
| 5,706,061 A * | 1/1998 | Marshall et al. | 348/743 |
| 6,726,333 B2 * | 4/2004 | Huibers et al. | 353/84 |
| 2004/0207650 A1 * | 10/2004 | Lin | 345/690 |

FOREIGN PATENT DOCUMENTS

| | | |
|---|---|---|
| EP | 0 589 179 | 3/1994 |
| EP | 1 292 134 | 3/2003 |
| EP | 1 377 074 | 1/2004 |
| EP | 1 655 636 | 5/2006 |
| JP | 03-163333 | 7/1991 |
| JP | 2004-144936 | 5/2004 |

* cited by examiner

Primary Examiner — Francis M Legasse, Jr.
(74) Attorney, Agent, or Firm — Antonelli, Terry, Stout & Kraus, LLP.

(57) ABSTRACT

A lighting unit that optimizes an oscillation frequency for oscillating a diffusion device and its amplitude amount and a projecting display using the lighting unit are provided. Driving of a light source driving unit is controlled on the basis of driving of the oscillation driving unit.

15 Claims, 9 Drawing Sheets

FIG. 1

(1 FILTER + OSCILLATION)

FIG. 3
(2 FILTERS + OSCILLATION)

FIG. 4
(TIMING DIAGRAM)

FIG. 5

(R/G/B COMBINED LIGHT; TIME DIVISION: OPTICAL MODULATION)

FIG. 6
(TIMING DIAGRAM AT THE TIME OF TIME DIVISION DRIVING)

FIG. 8
(MULTI-MODULE,FPD)

PROJECTION DISPLAY AND LIGHTING UNIT WITH DIFFUSION OPTICAL DEVICE

BACKGROUND OF THE INVENTION

This invention relates to a projection display that displays an image by projecting a luminous flux from a laser light source having coherency to an image display device.

JP-A-2004-144936 discloses a lighting unit including a diffusion element for distributing and diffusing coherent light incident from a semiconductor laser by changing its intensity distribution to a predetermined intensity distribution, and oscillation means for oscillating this diffusion element.

JP-A-3-163333 discloses a synchronized magnetic domain observation apparatus for extracting a specific change point of a magnetic domain image that changes at a high speed, by controlling on/off of a laser beam by a high speed shutter on the basis of coherency of the laser beam.

SUMMARY OF THE INVENTION

To suppress speckles (hereinafter referred to as "speckle noise") occurring at a part of a projected image owing to coherency in a lighting unit using a laser light source, JP-A-2004-144936 described above interposes a diffusion element between a semiconductor laser and a photo conductor. However, this reference does not at all describe control, etc, of the semiconductor laser when the diffusion element is operated. JP-A-3-163333 controls the high speed shutter in such a fashion as to correspond to the change of the magnetic domain image but doe not at all describe control of the laser light source.

The present invention is achieved in view of the background described above and is directed to provide a projection display and a lighting unit each of which optimizes an oscillation frequency and an amplitude amount when a diffusion element is oscillated, and a lighting unit.

According to one aspect of the invention, driving of a light source driving unit is controlled on the basis of driving of an oscillation driving unit.

Other objects, features and advantages of the invention will become apparent from the following description of the embodiments of the invention taken in conjunction with the accompanying drawings.

DETAILED DESCRIPTION OF THE EMBODIMENTS

Preferred embodiments of the invention will be hereinafter explained in detail with reference to the accompanying drawings.

Embodiment 1

Figure 1:
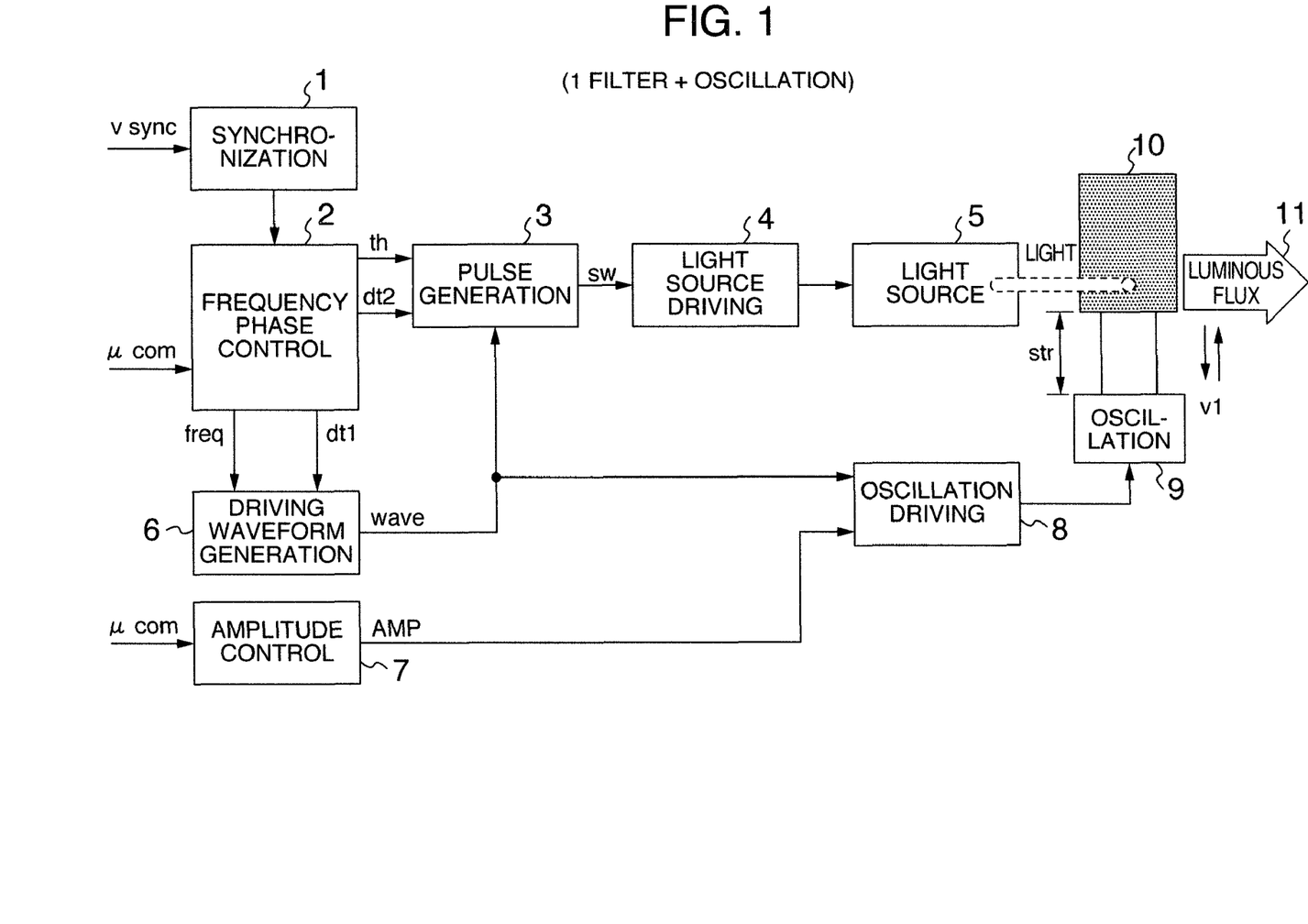
FIG. 1 shows a lighting unit according to Embodiment 1.
Figure 2:
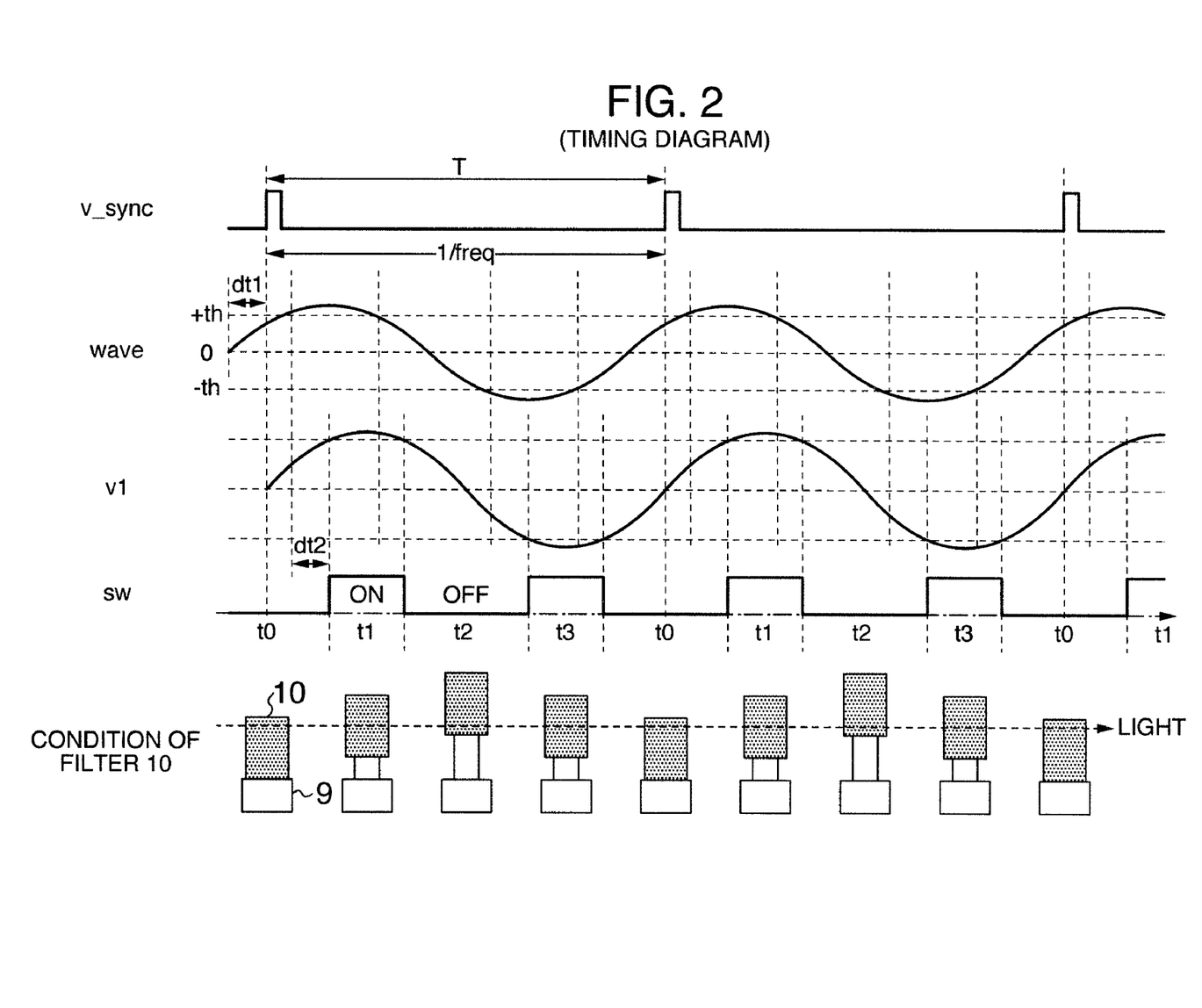
FIG. 2 is a timing diagram for supplementing the lighting unit of Embodiment 1.

FIG. 1 is a block diagram showing a lighting unit according to Embodiment 1. FIG. 2 is a timing diagram for supplementing operation and condition of the device.

Referring to FIG. 1, reference numeral 1 denotes a sync unit. Reference numeral 2 denotes a frequency/phase control unit. Reference numeral 3 denotes a pulse generation unit. Reference numeral 4 denotes a light source driving unit. Reference numeral 5 denotes a laser light source. Reference numeral 6 denotes a driving waveform generation unit. Reference numeral 7 denotes an amplitude control unit. Reference numeral 8 denotes an oscillation driving unit. Reference numeral 9 denotes an oscillation unit that is a VCM (Voice Coil Motor), for example. Reference numeral 10 denotes a diffusion filter as a diffusion optical element. Reference numeral 11 denotes a luminous flux that is diffused. FIG. 2 shows a basic timing signal v_sync having a time cycle T (frequency "freq") and inputted from outside, not shown, a driving waveform "wave", generated by the driving waveform generation unit 6, having the frequency "freq" and a phase difference dt1 generated in consideration of response delay of and the oscillation portion 9, an oscillation velocity "v1" of the diffusion filter 10 oscillated by the oscillation unit 9, a pulse signal sw generated by the pulse generation unit 3 and the condition of the diffusion filter 10 at each time t0, t1, t2, t3, and so forth.

Incidentally, though Embodiment 1 does not particularly limit the material of the diffusion filter 10, it will be assumed that the diffusion filter has a property of diffusing a transmitted luminous flux.

The sync unit 1 acquires an external timing signal v_sync and generates a basic timing signal (which is assumed coincident with v_sync in Embodiment 1). The frequency/phase control unit 2 detects the frequency of the basic timing signal v_sync and its phase to acquire system control "μcom" not shown and generates an oscillation frequency α·freq obtained by multiplying the frequency "freq" by α-times (α=1 in this embodiment), phase differences dt1 and dt2 and a waveform threshold value "th". The driving waveform generation unit 6 generates a driving waveform "wave" as a sinusoidal wave from the driving frequency α·freq, the basic timing signal v_sync and the phase difference dt1. The amplitude control unit 7 acquires the system control μ com and instructs an amplitude amplification amount AMP of the driving waveform "wave" that determines the amplitude amount of the diffusion filter 10. As a driving signal generated by amplifying the driving waveform "wave" by the amplitude amplification amount AMP by the oscillation driving unit 8 is applied, the oscillation unit 9 undergoes reciprocating oscillation having an oscillation frequency α·freq, an amplitude str and an oscillation velocity v1 and the diffusion filter 10 fitted to the oscillation unit operates in the interlocking arrangement. At this time, the oscillation velocity v1 responds with a response delay time dt2 of the diffusion filter 10 with respect to the driving waveform "wave" as shown in FIG. 2. FIG. 2 shows also the time change (t0, t1, t2, t3, t0, . . . ) and the condition of the reciprocating oscillation of the diffusion filter 10.

On the other hand, the pulse waveform generation unit 3 judges the period in which the diffusion filter 10 undergoing reciprocating oscillation is in the reversing operation period, that is, the period in which deceleration, stop and initial acceleration take place, from the difference between the waveform threshold value "th" and the signal amplitude amount of the driving waveform "wave". When the signal amplitude amount is smaller than +th but is greater than −th as shown in FIG. 2, for example, the pulse waveform signal sw is generated by delaying by a delay time dt2 the signal which is a Low signal (off period) as a period of the reversing operation and a High signal (on period) as other periods in which oscillation occurs at a predetermined velocity. In this embodiment, the pulse waveform signal has a pulse waveform that divides one cycle into four periods.

The laser light source 5 is driven by the light source driving unit 4 at a desired intensity indicated from outside during the on period of the pulse waveform signal "sw" to oscillate and emit light. In this instance, the optical axis of the luminous flux from the laser light source 5 is arranged to the center of the diffusion filter 10 undergoing reciprocating oscillation as shown in FIG. 2. Consequently, the luminous flux transmitting through the diffusion filter 10 is diffused and generates a luminous flux 11 the diffusions state of which moves, during the period in which the diffusion filter 10 undergoes reciprocating oscillation at a desired moving velocity (on period). On the other hand, the laser light source is turned off during the period in which the moving velocity is below the desired moving velocity (off period).

Here, the amplitude threshold value "th" and the amplitude amplification amount AMP may be fixed or may be adjusted depending on the material of the diffusion filter 10 selected and the intension of an observer.

According to the lighting unit of Embodiment 1, the luminous flux can be diffused by the diffusion filter 10 that is always at the desired moving velocity. Therefore, the speckle noise obtained by diffusion can be made time-wise uniform and dispersed and its recognizability can be reduced. On the other hand, the laser light source is prohibited from emitting light during the period in which the diffusion filter 10 is under the state of deceleration/stop/acceleration and the moving velocity is below the desired moving velocity. In consequence, spatial movement of the speckle noise becomes small and is time-wise fixed. Eventually, the speckle noise component is time-wise integrated on the retina of the observer and the state in which the speckle noise is recognized can be reduced. Furthermore, the increase of the oscillation frequency and the amplitude amount can be reduced to shorten the time in which the spatial movement of the speckle noise is small. It is possible in this way to reduce the oscillation frequency and the amplitude amount when the diffusion optical device is oscillated, without spoiling flatness of the speckle noise. In other words, the improvement of the performance of the oscillation unit 9 as a movable portion, the reduction of the noise resulting from the oscillation or the enlargement of the selection range of the material of the diffusion filter 10 owing to the reduction of the diffusion capacity can be achieved, and a lighting unit having a low cost can be provided. Furthermore, because the laser light source is driven in synchronism with the external reference frequency, a lighting unit that is turned on and off at a desired light emission timing can be provided.

Embodiment 2

Figure 3:
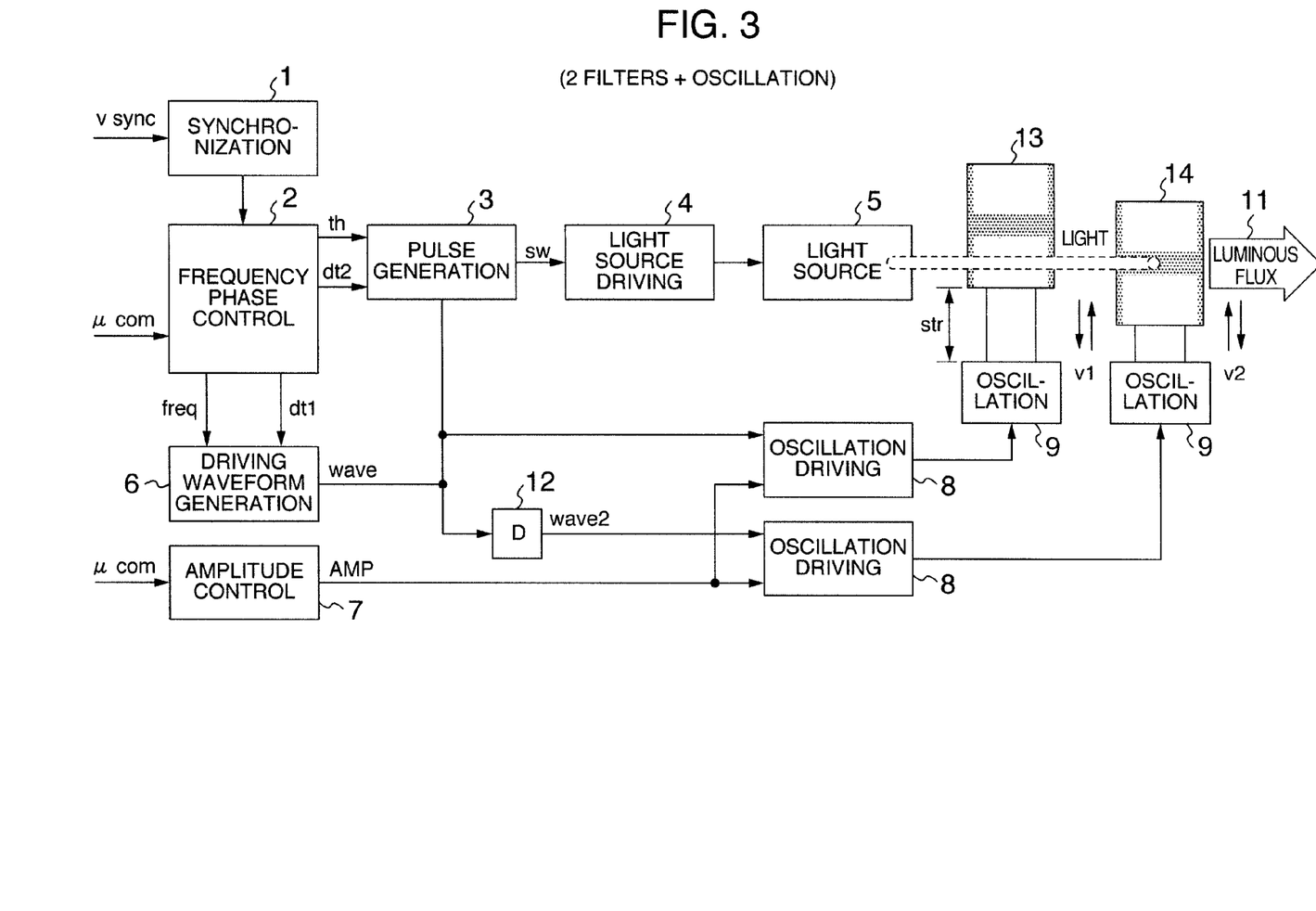
FIG. 3 shows a lighting unit according to Embodiment 2.
Figure 4:
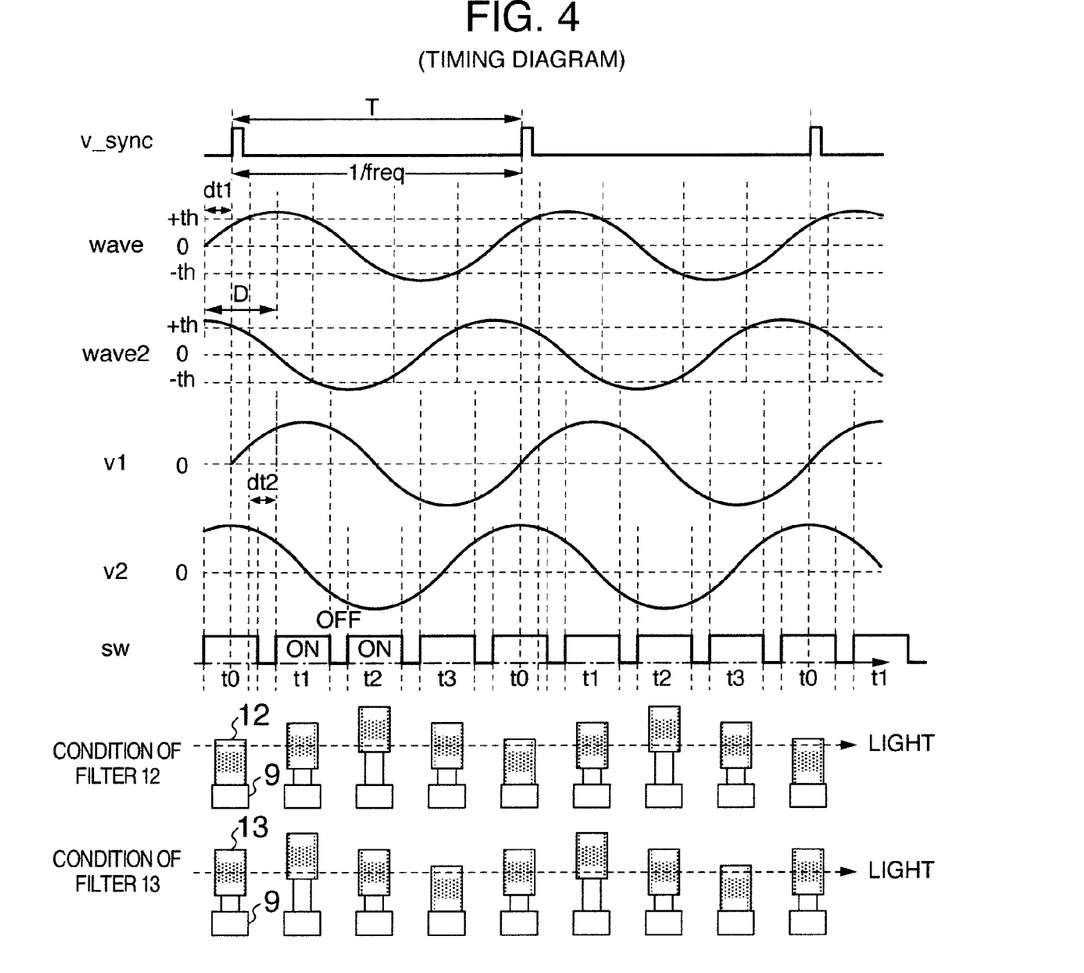
FIG. 4 is a timing diagram for supplementing the lighting unit of Embodiment 2.

FIG. 3 is a block diagram showing a lighting unit according to Embodiment 2. FIG. 4 is a timing diagram supplementing the operation and the condition of the device.

Referring to FIG. 3, reference numeral 12 denotes a delay unit. Reference numerals 13 and 14 denote diffusion filters each having a modified shape of the filter shape of the diffusion filter 10. In the drawing, the same reference numeral as the one used in Embodiment 1 represents the same function and explanation of such a function will be omitted. The device has a plurality each of the oscillation driving units 8 and the oscillation units 9 (two each, in Embodiment 2, for example).

The diffusion filters 13 and 14 have the same shape and are arranged on the same optical path of the luminous flux. When these filters are so arranged as to oscillate up and down as shown in FIG. 3, the luminous flux is allowed to penetrate in the regions of the diffusion filters (upper and lower portions in FIG. 3) which are on the optical axis of the luminous flux and in which a moving velocity does not reach the desired moving velocity. Such filters are formed by a transparent film or by cutting off.

The diffusion filters 13 and 14 undergo reciprocating oscillation by the same operation as in Embodiment 1. As to the diffusion filter 14, this filter 14 undergoes reciprocating oscillation at an amplitude amount str and a moving velocity v2 with reference to a driving waveform "wave2" obtained by deviating the phase of the driving waveform wave by 90° by the delay portion 12 as the reference. The pulse generation portion 3 generates a High signal (on period) as a period in which the filters oscillate at the desired velocity for the period where the signal amplitude amount of either the driving waveform "wave" or "wave2" is above +th or below −th, and a pulse waveform signal sw by delaying the signal by a delay time dt2 as a Low signal (off period) as other periods where the filters are under the reversing operation. Needless to say, because a phase difference of 90° exists between the driving waveforms "wave" and "wave2", the delay signal may be generated by comparing only the driving waveforms "wave" and delaying the phase by 90°.

Consequently, the luminous flux is diffused by the diffusion filter 14 while the diffusion filter 13 is under deceleration/stop/initial acceleration and during the period t0 and t2 in which the moving velocity of the diffusion filter 14 is above the desired moving velocity and during the on period. On the other hand, the luminous flux is diffused by the diffusion filter 13, generates the luminous flux diffused by the diffusion filter 13 and transmits through the diffusion filter 14 while the diffusion filter 14 is under deceleration/stop/initial acceleration and during the period t1 and t3 in which the moving velocity of the diffusion filter 13 is above the desired moving velocity and during the on period.

According to the lighting unit of Embodiment 2, the diffusion filters at the desired moving velocity can be alternately generated by oscillating a plurality of diffusion filters arranged on the same optical axis in such a fashion that the phases of their oscillation are different. Therefore, the improvement of time-wise utilization efficiency owing to the increase of the driving period of the laser light source and the reduction of the oscillation frequency and the amplitude amount owing to the reduction of the diffusion period in each diffusion filter become possible, and a lighting unit in which the diffusion filters have longer service life and which has low noise as well as low cost can be provided.

Embodiment 3

Figure 5:
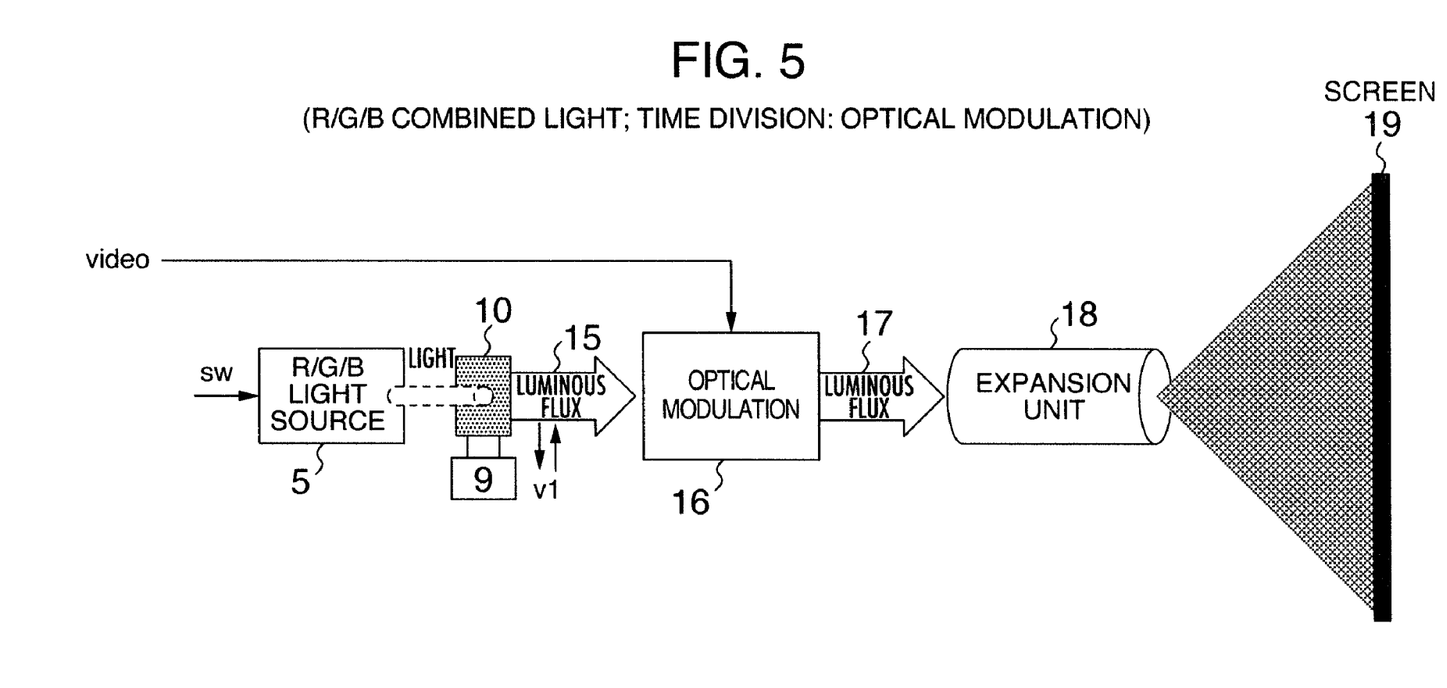
FIG. 5 shows a projection display of Embodiment 3.
Figure 6:
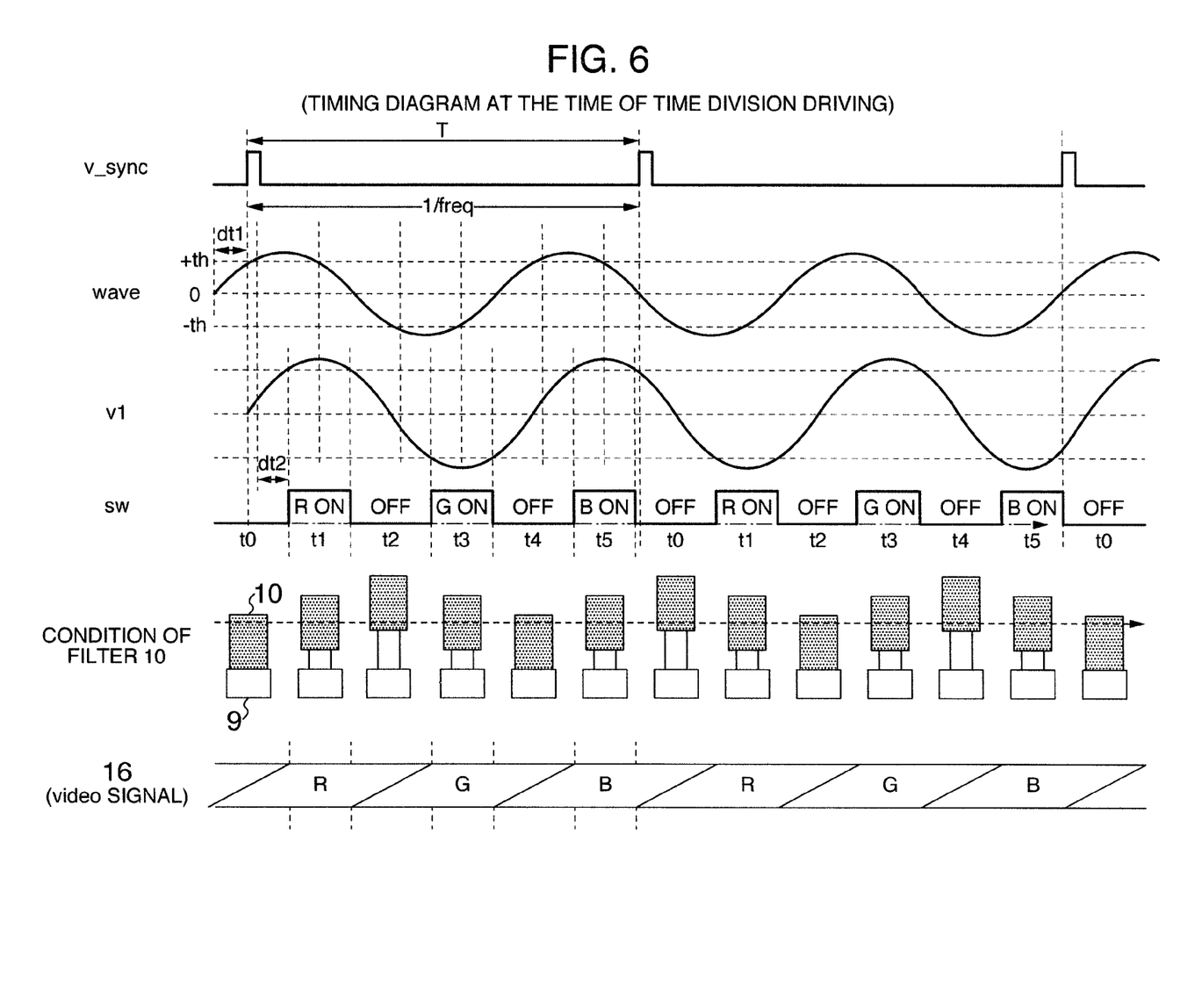
FIG. 6 is a timing diagram for supplementing the projection display of Embodiment 3.

FIG. 5 is a block diagram showing a projection display according to Embodiment 3. FIG. 6 is a timing diagram for supplementing the operation and the device condition.

Referring to FIG. 5, reference numeral 5 denotes a laser light source formed of R/G/B. Reference numeral 16 denotes a light modulation portion (reflection type or transmission type image display device such as DLP, DMD, etc). Reference numerals 15 and 17 denote luminous fluxes. Reference numeral 18 denotes a projection portion. Reference numeral 19 denotes a screen.

A transmission amount of a luminous flux 15 from a laser light source that is rendered non-coherent by the same method as the lighting unit shown in Embodiment 1 or 2 is controlled and modulated by the light modulation unit 16 on the basis of a video signal "video" to acquire a luminous flux (optical image) 17. This luminous flux 17 is projected on the screen 19 from the projection unit (projection lens, for example) 18. When the frame frequency of the video signal "video" is 60 Hz, for example, the laser light source 5 can emit light once, twice, thrice, . . . , and so forth, assuming that the oscillation frequency of the diffusion filter 10 is 30 Hz ($\alpha=0.5$ times), 60 Hz ($\alpha=1$ time), 90 Hz ($\alpha=1.5$ times), . . . , and so forth, respectively.

FIG. 6 shows the case where the oscillation frequency of the diffusion filter 10 is 90 Hz ($\alpha=1.5$ times), for example. In the on period t1, t3 and t5 of the laser light source 5 consisting of R/G/B, the display is turned on and off by alternately switching R/G/B and the light modulation unit 16 is serially modulated by the R/G/B signals of the video signal "video" in synchronism with the light emission timing of each color component. In this way, the image of R/G/B is projected on the screen 19 in one frame period. In the projection display of Embodiment 3, on the other hand, the diffusion filters 13 and 14 shown in Embodiment 2 may be used, too, and the number of times of turn-on/off of the R/G/B laser light source can be doubled in one frame period under the same oscillation frequency. At the same time, the R/G/B image is projected twice on the screen 19 within one frame period by setting modulation of the light modulation unit 16 by the R/G/B signal of the video signal "video" to two times. Needless to say, the R/G/B image can be projected once on the screen 19 within one frame period by setting the number of times $\alpha$ to $\alpha=0.75$ and the oscillation frequency to 45 Hz.

Embodiment 3 can provide a projection display having low recognizability of the speckle noise. Even when the response time for the video signal "video" is necessary for the light modulation unit 16, image reproducibility of the optical light unit 16 can be improved by bringing the response time into conformity with the off period of the laser light source 5, that is, the period of the stop of the diffusion filter 10.

Embodiment 4

Figure 7:
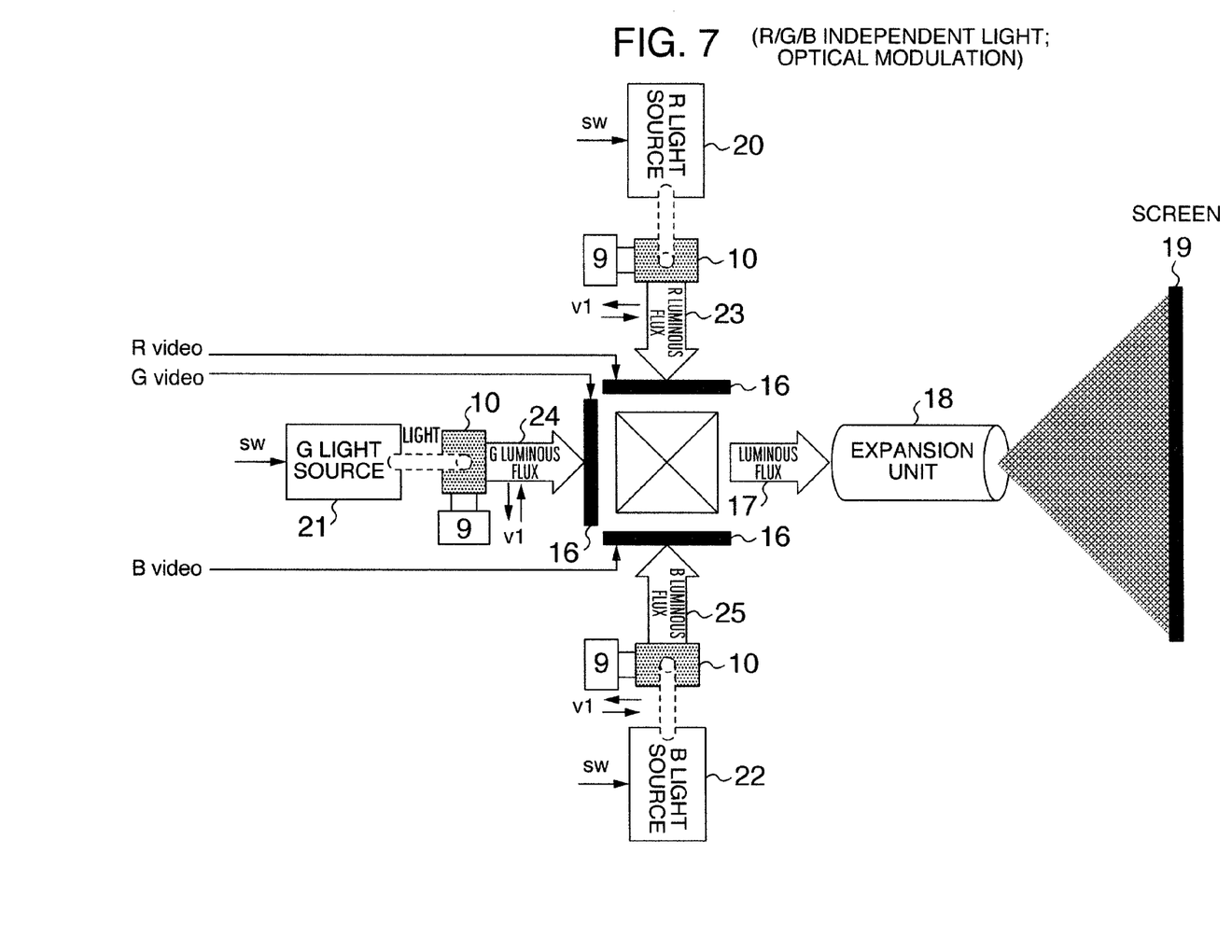
FIG. 7 shows a projection display of Embodiment 4.

FIG. 7 is a block diagram showing a projection display according to Embodiment 4.

A projection display of Embodiment 4 is similar to the projection display of Embodiment 3 but further includes a lighting unit consisting of laser light sources 20, 21 and 22 and three light modulation units 16 for at least the three primary colors (R/G/B) of video signals. A luminous flux 17 acquired by synthesizing the R/G/B luminous fluxes 23, 24 and 25 generated by the lighting units is projected on a screen 19 through a projection unit 18. The image is projected on the screen during the period in which the diffusion optical device of the lighting unit for each of R/G/B is accelerated and reaches a desired moving velocity.

Since the R/G/B light sources 20, 21 and 22 and the three light modulation units 16 can be independently driven in Embodiment 4 in comparison with Embodiment 3, the embodiment can provide a projection display that has small animation performance and low recognizability of the speckle noise.

Embodiment 5

Figure 8:
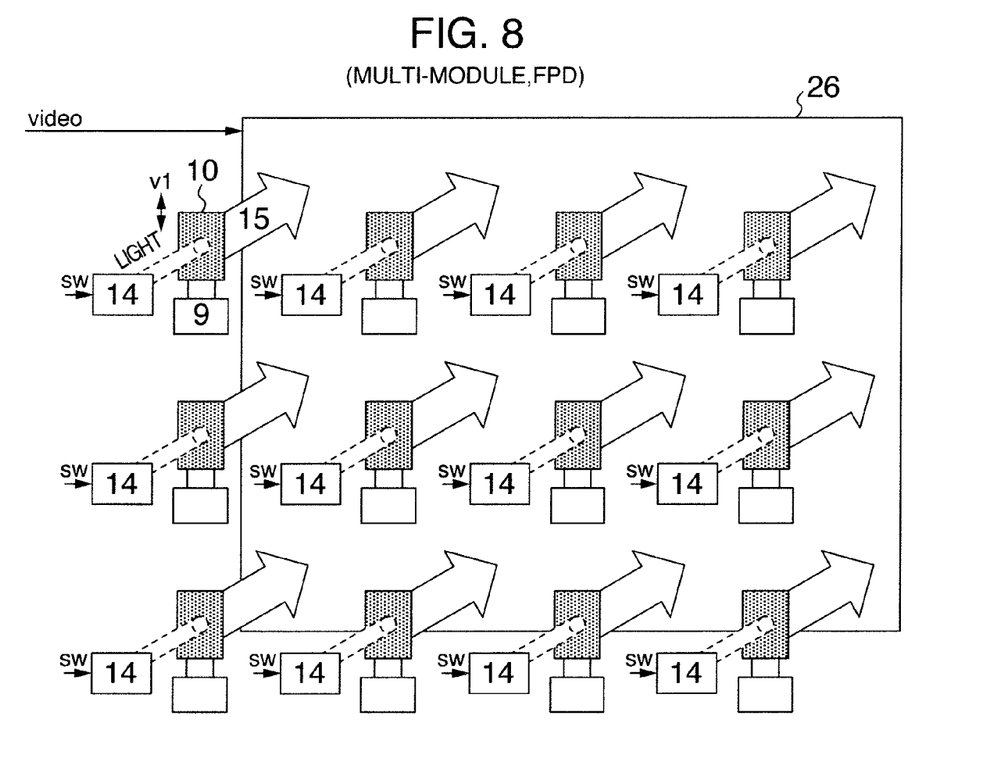
FIG. 8 shows a projection display of Embodiment 5.

FIG. 8 is a block diagram showing a projection display according to Embodiment 5.

In FIG. 8, the projection display further includes a plurality of lighting units of Embodiment 1 and a light modulation unit 26 for controlling the transmission amount of the luminous flux by the video signal "video". The lighting unit of Embodiment 2 may of course be used. However, the projection display must have the laser light sources for at least the three primary colors.

In Embodiment 5, the R/G/B luminous fluxes 15 generated during the period in which the diffusion filter 10 is accelerated and reaches a desired moving velocity in each lighting unit are allowed to be incident into divided areas of the light modulation unit 26 and the image is displayed by the modulated luminous fluxes.

According to Embodiment 5, since a plurality of lighting units can be arranged in accordance with the size of the display area of the light modulation unit 26, an optimal arrangement can be achieved so that the luminous flux 15 generated by each lighting unit is uniformly incident into the light modulation unit 26. Furthermore, it is easy to align the oscillation phase of each lighting unit and to bring it into conformity with image write and response time for each frame of the light modulation unit 26. Therefore, even when the display area increases, it is possible to provide a direct-vision projection display in which animation performance and recognizability of the speckle noise are low and non-uniformity of luminance inside the screen is less.

Embodiment 6

Figure 9:
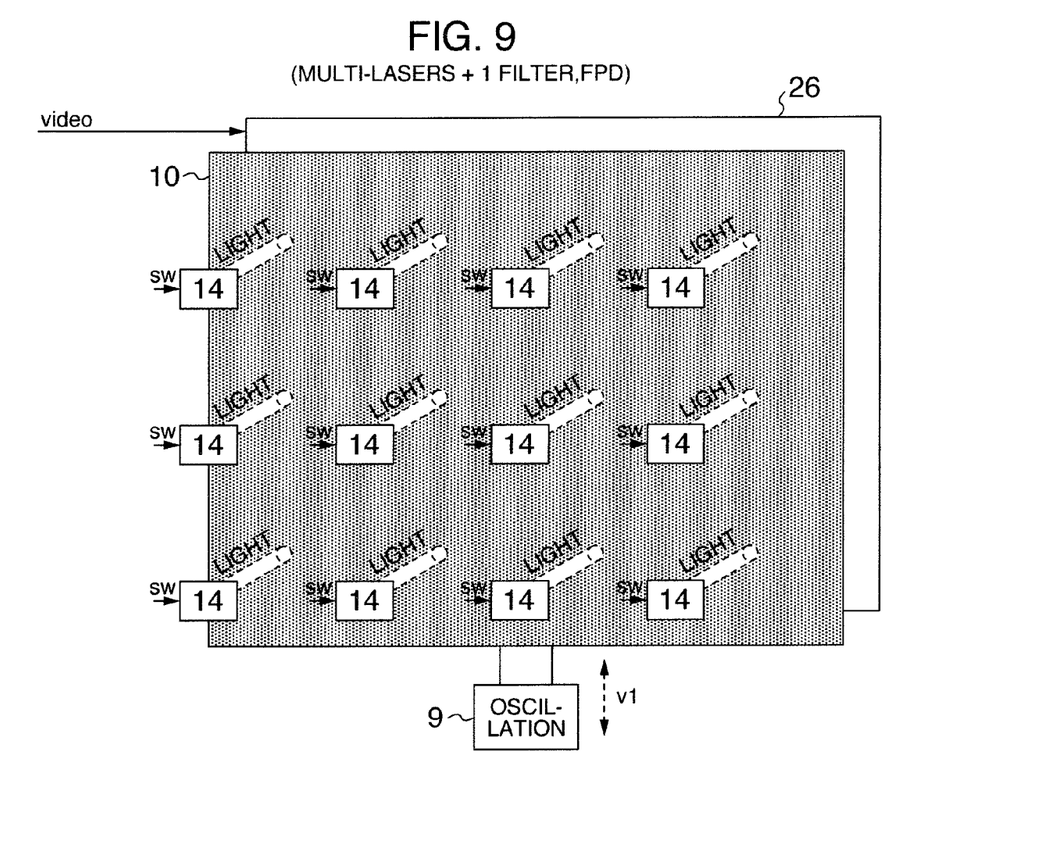
FIG. 9 shows a projection display of Embodiment 6.

FIG. 9 is a block diagram showing a projection display according to Embodiment 6.

In FIG. 9, a lighting unit 14 is a projection display of Embodiment 5 and a plurality of lighting units shares oscillation units 9 and diffusion filters 10 and is operated in the same way as in Embodiment 5.

In addition to the effects of Embodiment 5, this Embodiment 6 makes it easy to eliminate diffusion unevenness and to make an oscillation state uniform by rendering the diffusion filter 10 discrete, and to reduce time limitation of a light emission timing of a laser light source 5.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection display which modulates a luminous flux into an optical image for an image display device, and projects the optical image from a projection lens, comprising:
    a laser light source configured to emit a luminous flux;
    a diffusion optical device configured to diffuse the luminous flux emitted from the laser light source;
    an oscillation unit configured to oscillate the diffusion optical device back and forth in a linear direction perpendicular to the direction of the luminous flux;
    an oscillation driving unit configured to drive the oscillation unit;
    a light source driving unit configured to drive the laser light source;
    a control unit configured to control the driving of the light source driving unit, based at least in part on a driving waveform;
    at least one additional oscillation unit; and
    at least one additional oscillation driving unit;
    wherein each additional oscillation driving unit corresponds to a respective additional oscillation unit; and wherein each oscillation driving unit generates a waveform with a phase different from a phase of a respective waveform generated by any other oscillation driving unit.

2. The projection display according to claim 1, further comprising a delay unit configured to delay the driving of the oscillation unit.

3. The projection display according to claim 1, wherein the driving waveform is also sent to the oscillation driving unit.

4. The projection display according to claim 3, wherein the driving waveform is generated by a driving waveform generation unit.

5. The projection display according to claim 4, wherein the driving waveform generation unit is controlled by the control unit.

6. A projection display which modulates a luminous flux into an optical image for an image display device, and projects the optical image from a projection lens, comprising:
   a laser light source configured to emit a luminous flux;
   a diffusion optical device configured to diffuse the luminous flux emitted from the laser light source;
   an oscillation unit configured to oscillate the diffusion optical device back and forth in a linear direction perpendicular to the direction of the luminous flux;
   an oscillation driving unit configured to drive the oscillation unit;
   a light source driving unit configured to drive the laser light source;
   a pulse generation unit configured to generate a pulse signal which controls driving of the light source driving unit;
   a driving waveform generation unit configured to generate a driving waveform, and transmit the driving waveform to the oscillation driving unit;
   at least one additional oscillation unit; and
   at least one additional oscillation driving unit;
   wherein the light source driving unit is configured to be controlled based at least in part on a threshold value of the driving waveform;
   wherein each additional oscillation driving unit corresponds to a respective additional oscillation unit; and
   wherein each oscillation driving unit generates a waveform with a phase different from a phase of a respective waveform generated by any other oscillation driving unit.

7. The projection display according to claim 6, wherein the light source driving unit executes driving when the driving waveform is greater than a threshold value of the driving waveform.

8. The projection display according to claim 6, further comprising a delay unit configured to delay driving of the oscillation driving unit.

9. The projection display according to claim 6, wherein the pulse generation unit is configured to generate a pulse waveform signal based on a threshold value of the driving waveform.

10. The projection display according to claim 9, wherein the threshold value of the driving waveform is generated and transmitted by a control unit.

11. A lighting unit comprising:
   a laser light source configured to emit a luminous flux;
   a diffusion optical device configured to diffuse the luminous flux emitted from the laser light source;
   an oscillation unit configured to oscillate the diffusion optical device back and forth in a linear direction perpendicular to the direction of the luminous flux;
   an oscillation driving unit configured to drive the oscillation unit;
   a light source driving unit configured to drive the laser light source;
   a control unit configured to control the driving of the light source driving unit, based at least in part on a driving waveform;
   at least one additional oscillation unit; and
   at least one additional oscillation driving unit;
   wherein each additional oscillation driving unit corresponds to a respective additional oscillation unit: and
   wherein each oscillation driving unit generates a waveform with a phase different from a phase of a respective waveform generated by any other oscillation driving unit.

12. The lighting unit according to claim 11, further comprising a delay unit configured to delay driving of the oscillation unit.

13. The projection display according to claim 11, wherein the driving waveform is also sent to the oscillation driving unit.

14. The projection display according to claim 13, wherein the driving waveform is generated by a driving waveform generation unit.

15. The projection display according to claim 14, wherein the driving waveform generation unit is controlled by the control unit.

* * * * *